(12) United States Patent
Zeitel (10) Patent No.: US 11,697,521 B2
(45) Date of Patent: Jul. 11, 2023

(54) TOOLS AND PROCESS FOR THE PRODUCTION OF A CONTAINER

(71) Applicant: Variotech GmbH, Nordhorn (DE)

(72) Inventor: Eric Zeitel, Neuenhaus (DE)

(73) Assignee: Variotech GmbH, Nordhorn (DE)

( * ) Notice: Subject to any disclaimer, the term of this patent is extended or adjusted under 35 U.S.C. 154(b) by 382 days.

(21) Appl. No.: 16/877,888

(22) Filed: May 19, 2020

(65) Prior Publication Data
US 2020/0377253 A1    Dec. 3, 2020

(30) Foreign Application Priority Data

May 28, 2019   (DE) ................ 10 2019 207 818.4

(51) Int. Cl.
| | |
|---|---|
| *B65D 1/26* | (2006.01) |
| *B29C 51/30* | (2006.01) |
| *B65D 21/02* | (2006.01) |

(52) U.S. Cl.
CPC ............ *B65D 1/26* (2013.01); *B29C 51/30* (2013.01); *B65D 21/0213* (2013.01)

(58) Field of Classification Search
CPC ............ B65D 88/745; B65D 5/246; B65D 2581/055; B65D 2581/053; B65D 2519/00462; B65D 1/26; B65D 21/0213; B29C 51/30; B29C 51/08; B29C 51/346; B29L 2031/7162; B29L 2031/7134
See application file for complete search history.

(56) References Cited

U.S. PATENT DOCUMENTS

| | | | | |
|---|---|---|---|---|
| 3,975,493 A | * | 8/1976 | Tigner | .............. B29C 51/08 |
| | | | | 264/550 |
| 4,338,070 A | * | 7/1982 | Nava | ............ A42B 3/063 |
| | | | | 425/417 |

(Continued)

FOREIGN PATENT DOCUMENTS

| | | |
|---|---|---|
| DE | 3814999 A1 | 11/1989 |
| DE | 19927069 A1 | 12/2000 |

(Continued)

OTHER PUBLICATIONS

European Patent Office, European Search Report in application No. EP 20176469.3, dated Sep. 18, 2020, Munich, Germany.

(Continued)

*Primary Examiner* — Kareen K Thomas
(74) *Attorney, Agent, or Firm* — Marshall & Melhorn, LLC (57) ABSTRACT

A tool for producing a plastic container in a thermoform process, in particular a plastic deep drawing process, with a positive mold, is described. The container may have a bottom section for forming a container bottom. The container may also have a lateral wall section for forming a circumferential, lateral wall integrally formed with the container bottom from the same material. The container may also have a wall for forming a stacking edge formed as a hollow profile, circumferentially protruding beyond an external contour of the lateral wall of the container. In a molding position for forming the container, the wall is arranged circumferentially protruding around an entire external side of the positive mold. The wall is movable out of the molding position into a demolding position. A method for producing the container by the tool is also provided.

11 Claims, 9 Drawing Sheets

(56) References Cited

U.S. PATENT DOCUMENTS

| | | | |
|---|---|---|---|
| 4,961,700 A * | 10/1990 | Dunbar | B29C 70/48 |
| | | | 425/398 |
| 5,198,244 A | 3/1993 | Rice | |
| 7,311,218 B2 * | 12/2007 | Varadarajan | B65D 21/022 |
| | | | 206/508 |
| 9,187,209 B1 * | 11/2015 | Hanna | B65D 43/0254 |
| 9,493,266 B1 * | 11/2016 | Jankowski | B65D 1/02 |
| 9,796,511 B2 * | 10/2017 | Cimmerer | B65D 43/26 |
| 10,562,680 B2 * | 2/2020 | Wallace | B29C 51/266 |
| 11,192,287 B2 * | 12/2021 | Koerner | B29C 49/4273 |
| 2011/0049196 A1 * | 3/2011 | Sturk | B65D 47/103 |
| | | | 222/541.9 |
| 2011/0226719 A1 * | 9/2011 | Park | B65D 21/0222 |
| | | | 206/509 |
| 2012/0181280 A1 * | 7/2012 | Barbier | B65D 43/162 |
| | | | 220/268 |
| 2012/0211458 A1 * | 8/2012 | Patel | B65D 83/38 |
| | | | 215/44 |
| 2014/0010909 A1 * | 1/2014 | McCready | B29C 49/071 |
| | | | 425/525 |
| 2015/0190975 A1 * | 7/2015 | Yokobayashi | B29C 49/58 |
| | | | 425/535 |
| 2015/0298871 A1 * | 10/2015 | Charron | B65D 77/2072 |
| | | | 220/324 |
| 2019/0105805 A1 * | 4/2019 | Dubuque | B29C 49/06 |
| 2020/0223109 A1 * | 7/2020 | Kuruvilla | B65D 1/34 |

FOREIGN PATENT DOCUMENTS

| | | |
|---|---|---|
| DE | 19964255 C2 | 7/2002 |
| EP | 2641722 A1 | 9/2013 |
| JP | H08127059 A | 5/1996 |

OTHER PUBLICATIONS

German Patent and Trademark Office, Office Action in Application No. De 10 2019 207 818.4, dated Feb. 3, 2020. 4 pages. Munich, Germany.

\* cited by examiner

TOOLS AND PROCESS FOR THE PRODUCTION OF A CONTAINER

The invention relates to a tool for producing a container.

Furthermore, the invention relates to a method of producing a container.

DE 199 64 255 C2 discloses a shipping container made from plastic having a bottom and a circumferential, lateral wall integrally formed with the bottom from the same material as well as flanges circumferentially protruding beyond an external contour of the lateral wall around the entire external container face. On their lower side the flanges include an angle smaller than 90° with the lateral wall, and they are formed as an inwardly open notch.

Furthermore, DE 199 64 255 C2 discloses a shipping container formed as a deep-drawn plastic part having a bottom and a circumferential, lateral wall integrally formed with the bottom from the same material. The shipping container comprises a flange formed as a hollow profile, circumferentially protruding beyond an external contour of the lateral wall around the entire external container face. The flange is formed as an inwardly open notch toward an inner side of the container and arranged spaced from the bottom. A lateral wall adjacent the flange in a downward direction is recessed at least by a wall thickness of the lateral wall and on its lower side the flange includes an angle smaller than 90° with the lateral wall. A simple circumferential flange is provided in the upper edge area of the lateral wall; on its lower side this flange includes an angle smaller than 90° with the lateral wall.

The object of the invention is to provide a novel tool for producing a container and a novel method for producing a container.

According to the invention, the object is achieved by a tool having the features recited in claim 1 and by a method having the features recited in in the method claims.

Advantageous embodiments of the invention are given in the dependent claims.

The tool according to the invention for producing a plastic container in a thermoform process, in particular a plastic deep drawing process, comprises a positive mold. The positive mold comprises a bottom section for forming a container bottom, a lateral wall section for forming a circumferential, lateral wall integrally formed with the bottom from the same material, and a wall for forming a stacking edge formed as a hollow profile, circumferentially protruding beyond an external contour of the lateral wall around an entire external container face, wherein the stacking edge is inwardly formed as an open notch toward an inner container side and arranged spaced from the bottom. In a molding position for forming the container, the wall is arranged circumferentially protruding around an entire external side of the positive mold, wherein an angle smaller than 90° is formed between a wall side directed toward the bottom section and a portion of the associated lateral wall section extending from this wall side toward the bottom section. In addition, the wall, which is for example formed as a circumferential wall portion, is movable out of the molding position into a demolding position, wherein a distance of the protruding end of the wall to the lateral wall section is reduced in the demolding position.

A container, in particular a shipping container, which comprises at least one stacking edge formed as an inwardly open notch, can be produced by means of the tool in a thermoform process, in particular a plastic deep drawing process. In this context, the movement of the wall into the demolding position allows for a release of the stacking edge during deforming and thus for a deforming of the container without damaging or destroying the stacking edge in a particularly easy way.

In a possible embodiment of the tool the wall comprises a plurality of wall segments which in each case are swivel-mounted on the lateral wall section. In the molding position, a movement of the wall segments in the molding direction, starting from the bottom section along the lateral wall section, is blocked. On the contrary, the movement in the demolding direction which extends contrary to the molding direction is enabled. Therefore, on the one hand, the thermoforming can be put into effect while ensuring a desired position of the wall, and on the other hand, the wall segments are pivoted during movement of the container in the demolding direction, i.e. during a reverse movement, in such a way that they release the stacking edge, i.e. the inwardly directed notch.

In a further possible embodiment of the tool the swivel-mounted wall segments are in each case coupled to at least one spring which exerts a force on the wall segments against a pivoting direction. The generated spring force allows for ensuring the molding position of the wall as the container is formed and for a reliable and automatic return of the wall into this molding position after demolding the container in a particularly reliable and easy way.

In a further possible embodiment of the tool the wall comprises a plurality of wall segments formed as sliders, which, starting from the molding position, can be moved into an interior of the positive mold. Wall segments movable in this way allow for a complete release of the stacking edge, i.e. the inwardly directed notch, during demolding of the container, whereby a deformation of the stacking edge is not required for demolding.

In a further possible embodiment of the tool, wall segments arranged at corners of the lateral wall section are configured as gravity sliders, which are blocked by the lateral wall section and adjacent sliders in the molding position, and which are released after moving the adjacent sliders into the interior of the positive mold in such a way that these move automatically into the interior of the positive mold, e.g. into an initial position, during demolding due to gravity. This embodiment allows for a particularly reliable production of the container having the stacking edge due to a particularly reliable and safe positioning of the wall segments during the molding, and for a reliable and technically easily implementable release of the stacking edge, i.e. the inwardly directed notch, during demolding of the container.

In a further possible embodiment of the tool, the sliders are coupled in each case to a motor-driven, hydraulic and/or pneumatic drive for performing the movement. Thus, a conveniently accomplishable and swift movement of the slider can be implemented with a defined course of movement.

In the method for producing a container according to the invention using a tool as described above, a molding blank made from a thermoplastic is heated in a thermoforming process, in particular a plastic deep drawing process. Subsequently, the molding blank is being remolded by means of the positive mold, wherein a container bottom is formed from the molding blank at the bottom section of the positive mold, a circumferential, lateral wall is being integrally formed with the bottom from the same material at a lateral wall section, and a stacking edge formed as a hollow profile, circumferentially protruding beyond an external contour of the lateral wall of the container around an entire external container face is being formed at a wall arranged at the lateral wall section, wherein the stacking edge is inwardly formed as an open notch toward an inner container side and arranged spaced from the bottom. As the molding blank is being remolded into the container, the wall is being arranged in a molding position circumferentially protruding around an entire external face of the positive mold in such a way that an angle smaller than 90° is formed between a wall side directed toward the bottom section and a portion of the associated lateral wall section extending from this wall side toward the bottom section. Moreover, after molding the molding blank, the wall is being moved into a demolding position, in which a distance of an end of the wall protruding in the molding position to the lateral wall section is reduced.

The method allows for producing a container, in particular a shipping container, in a thermoforming process, in particular a plastic deep drawing process, wherein the container comprises at least one stacking edge formed as an inwardly open notch. In this context, the movement of the wall into the demolding position allows for a release of the stacking edge during the demolding process and thus for a demolding of the container in a particularly easy way without damaging or destroying the stacking edge.

In a possible embodiment of the method the movement of the wall into the demolding position during demolding of the container from the positive mold is guided by the container. This allows for ensuring the same relative position of the wall segments to the container at a defined position of the container during demolding and thus a result which is always consistent and therefore a consistent quality.

In a further possible embodiment of the method, prior to demolding, the container is cooled down to a temperature allowing for an elastic deformation of the container at least in the area of the stacking edge. Thus, a plastic deformation of the stacking edge during demolding of the container and a resulting damage thereof can be avoided.

In a further possible embodiment of the method the movement of the wall into the demolding position is carried out by at least one motor-driven, hydraulic and/or pneumatic drive. Thus, a conveniently accomplishable and swift movement of the slider can be implemented with a defined course of movement.

In the following, embodiments of the invention are explained in more detail with the help of drawings.

Corresponding parts are provided with the same reference signs in all figures.

Figure 1:
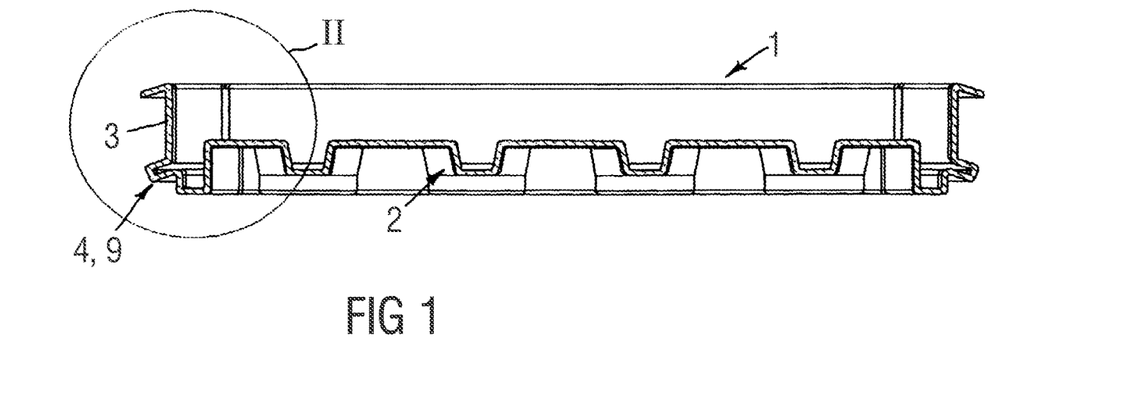
FIG. 1 is a schematic sectional view of a container.

FIG. 1 shows a sectional view of a possible embodiment of a container 1.

Figure 2:
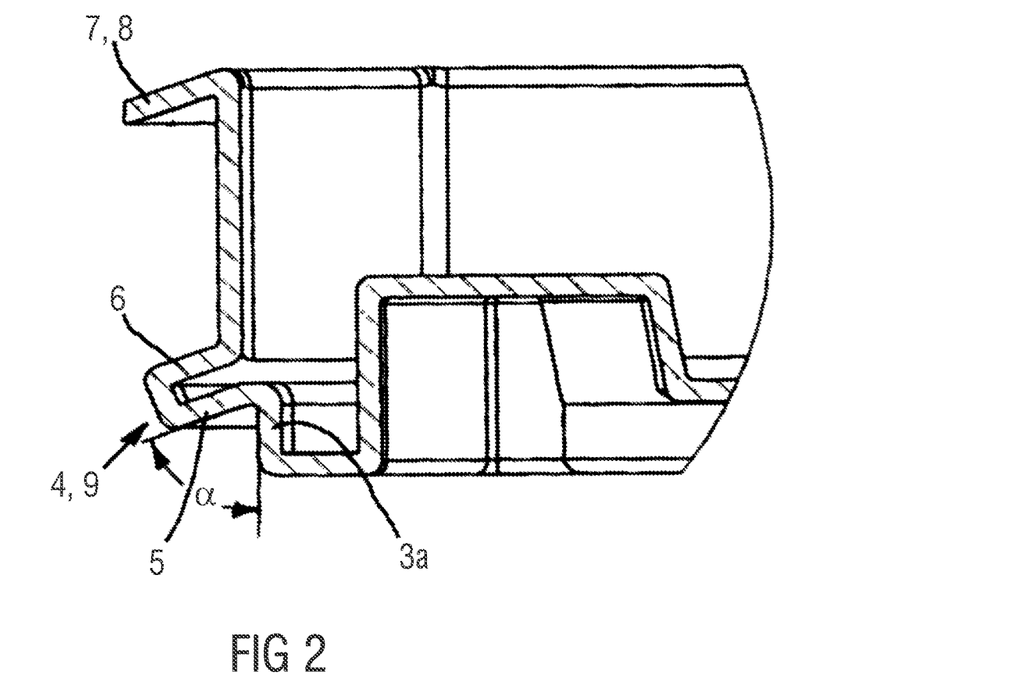
FIG. 2 is a schematic enlarged detail of the sectional view according to FIG. 1.

The container 1 is for example configured as a shipping container or packaging container and comprises a container bottom 2, whose characteristics are adapted to the goods to be shipped. For example, the container bottom 2 is profiled in such a way that it comprises so called cavities which allow for a slip-proof and damage free shipping of the goods to be inserted. Depending on the requirements the container bottom 2 can also have different characteristics, for example it can have a flat configuration.

Adjacent the container bottom 2, a circumferential, lateral wall 3 is integrally formed with the container bottom 2 from the same material. In the illustrated embodiment of the container 1, the lateral wall 3 terminates in a flange 7 in the upper region, which flange 7 is integrally formed from the same material circumferentially around the entire container 1 and protrudes beyond an external face of the lateral wall 3. In this context, the flange 7 is configured as a stacking edge 8.

In the lower range of the container 1, a further outwardly protruding flange 4 is arranged which is configured as an inwardly open notch and therefore comprises an upper side 6 and a lower side 5. A section 3a of the lateral wall 3 protruding downward from the flange 4 in this area is recessed relative to the rest of the lateral wall 3 by an extent at least corresponding to a size or thickness of the material of the lateral wall 3 but slightly greater in a possible embodiment, such that a problem-free, jamming-free stacking of multiple containers 1 one above the other and in sections one within the other is possible.

At its lower side 5 the flange 4 is inclined relative to the adjacent section 3a of the lateral wall 3 and includes an angle α smaller than 90° with the section 3a of the lateral wall 3.

The flange 7 likewise includes an angle smaller than 90° such that the flange 7 positions with its upper side below the lower side 5 of the flange 4 when stacking multiple containers 1, such that a dust-proof and splash water-proof contact of the individual containers 1 is achieved when stacking. The flange 4 therefore also provides a stacking edge 9.

Figure 3:
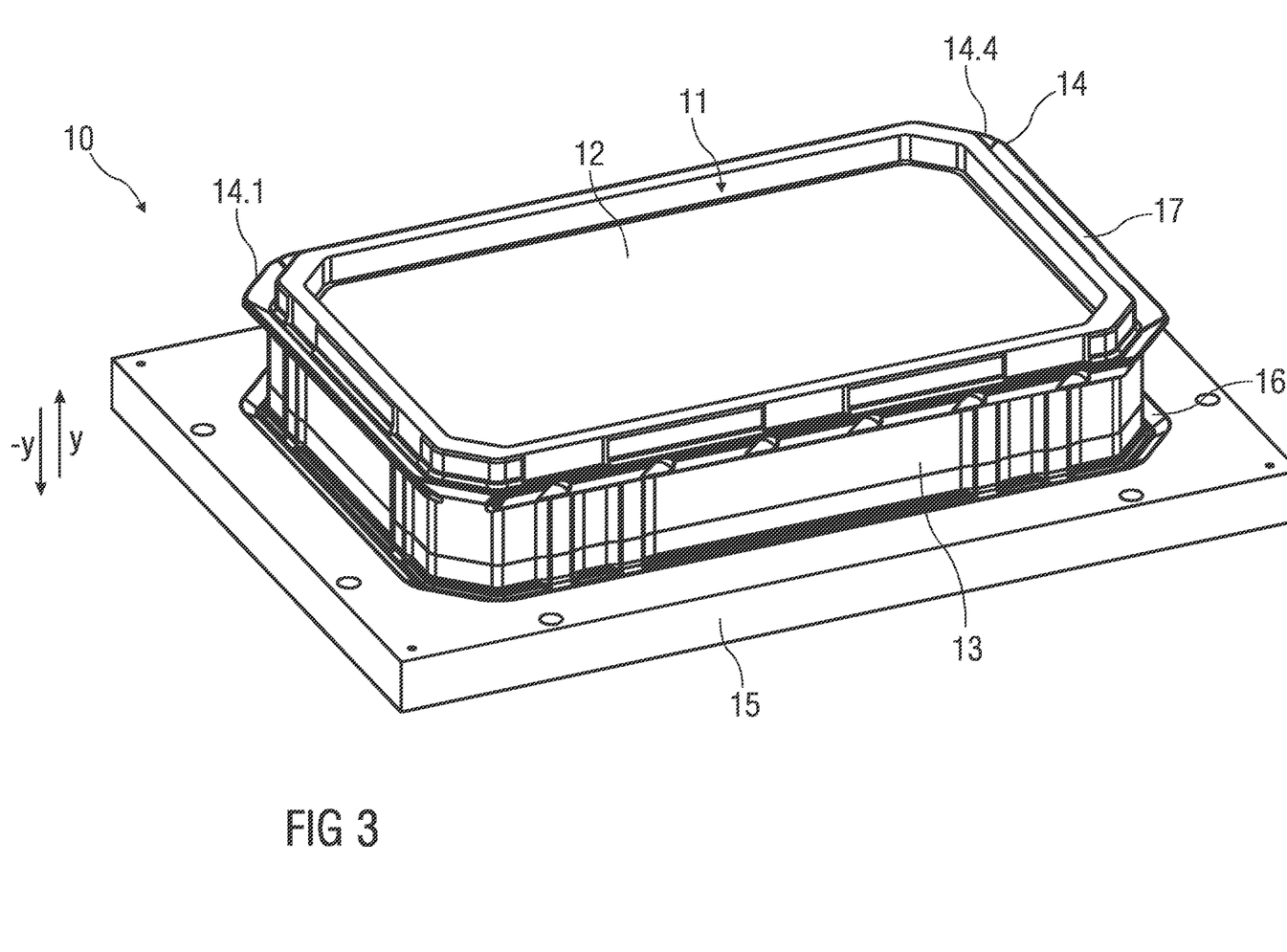
FIG. 3 is a schematic perspective view of a first embodiment of a tool.

FIG. 3 is a perspective view of a possible embodiment of a tool 10 for producing a container 1 as shown in FIGS. 1 and 2.

The production of the container 1 is being carried out by means of the tool 10 in a thermoforming process from a molding blank made of plastic, in particular in a plastic deep drawing process.

For the purpose of this thermoforming process the tool 10 comprises a positive mold 11 with a bottom section 12 for forming the container bottom 2.

Furthermore, the positive mold 11 comprises a lateral wall section 13 for forming the circumferential lateral wall 3 integrally formed with the container bottom 2 from the same material.

Furthermore, the positive mold 11 comprises a wall 14 for forming the stacking edge 9, formed as a hollow profile, circumferentially protruding beyond the external contour of the lateral wall 3 around an entire external container face, wherein the stacking edge 9 is inwardly formed as an open notch toward an inner container side and arranged spaced from the container bottom 2.

In addition, the positive mold 11 comprises a base plate 15, extending from which the lateral wall section 13 protrudes basically perpendicular upward. In a transitional area between the base plate 15 and the lateral wall section 13 a circumferential recess 16 is arranged for forming the upper stacking edge 8 of the container 1.

Firstly, in order to produce the container 1, the molding blank (not shown in detail) made from plastic, in particular thermoplastic, is heated to become deformable. The heating is achieved for example by means of external heat sources (not shown in detail).

Figure 4:
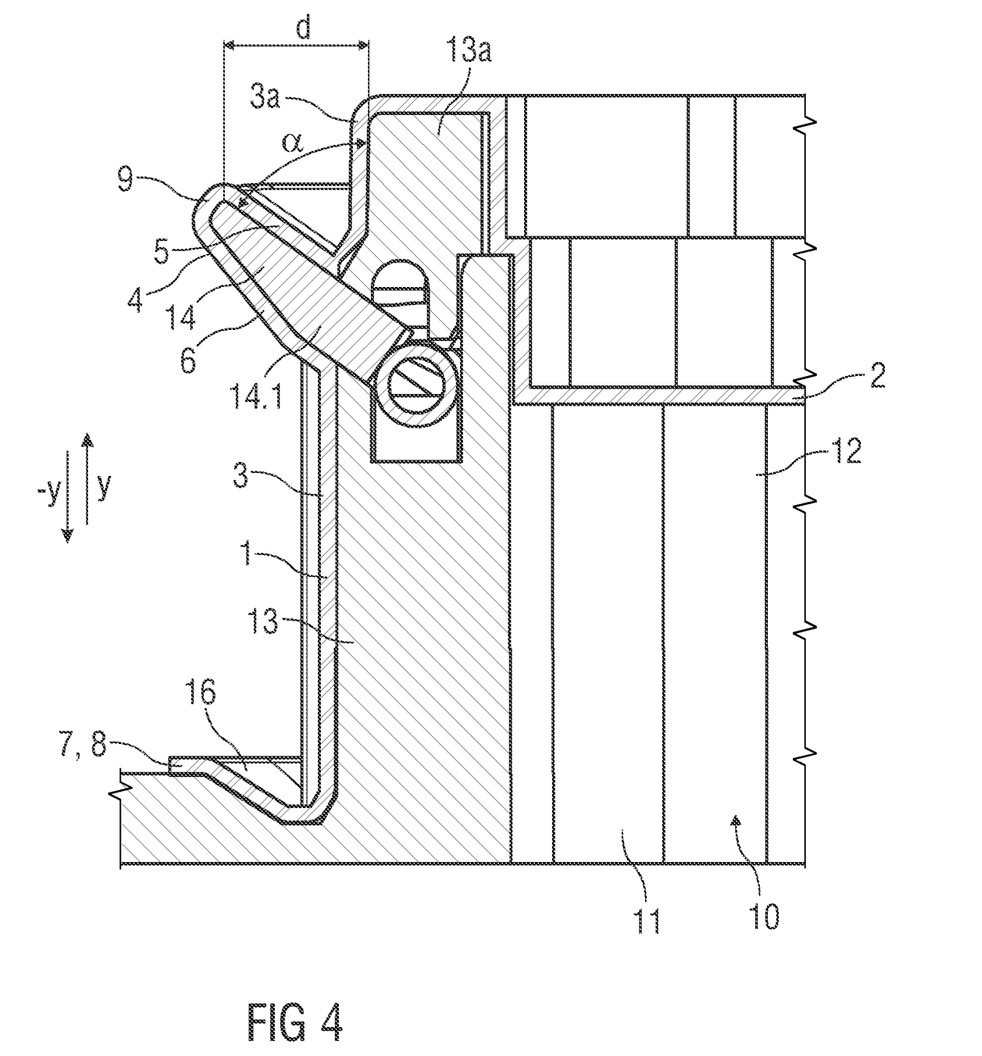
FIG. 4 is a schematic sectional view of the tool according to FIG. 1 and a container arranged within the tool in a first position.
Figure 5:
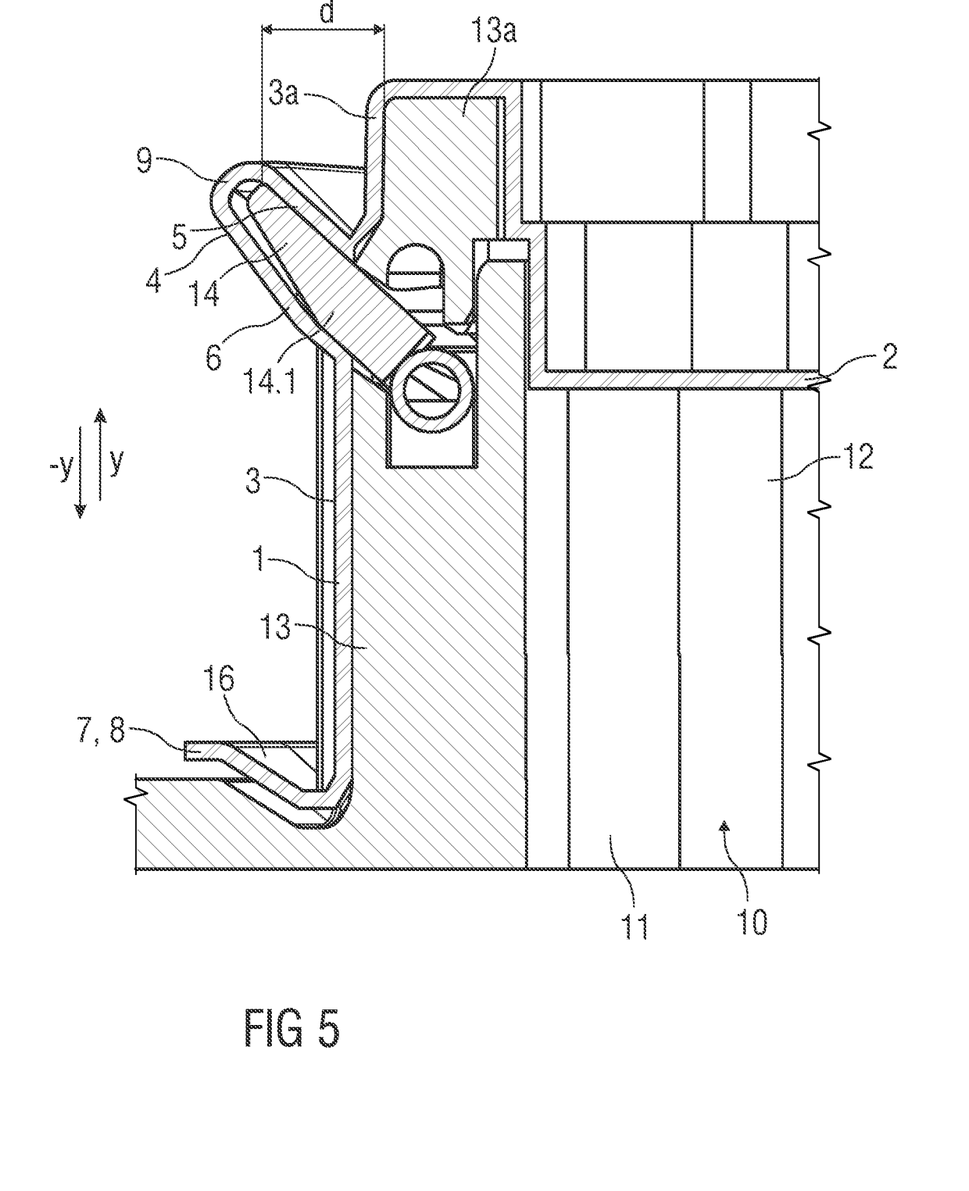
FIG. 5 is a schematic sectional view of the tool according to FIG. 1 and a container arranged within the tool during a demolding process in a second position.
Figure 6:
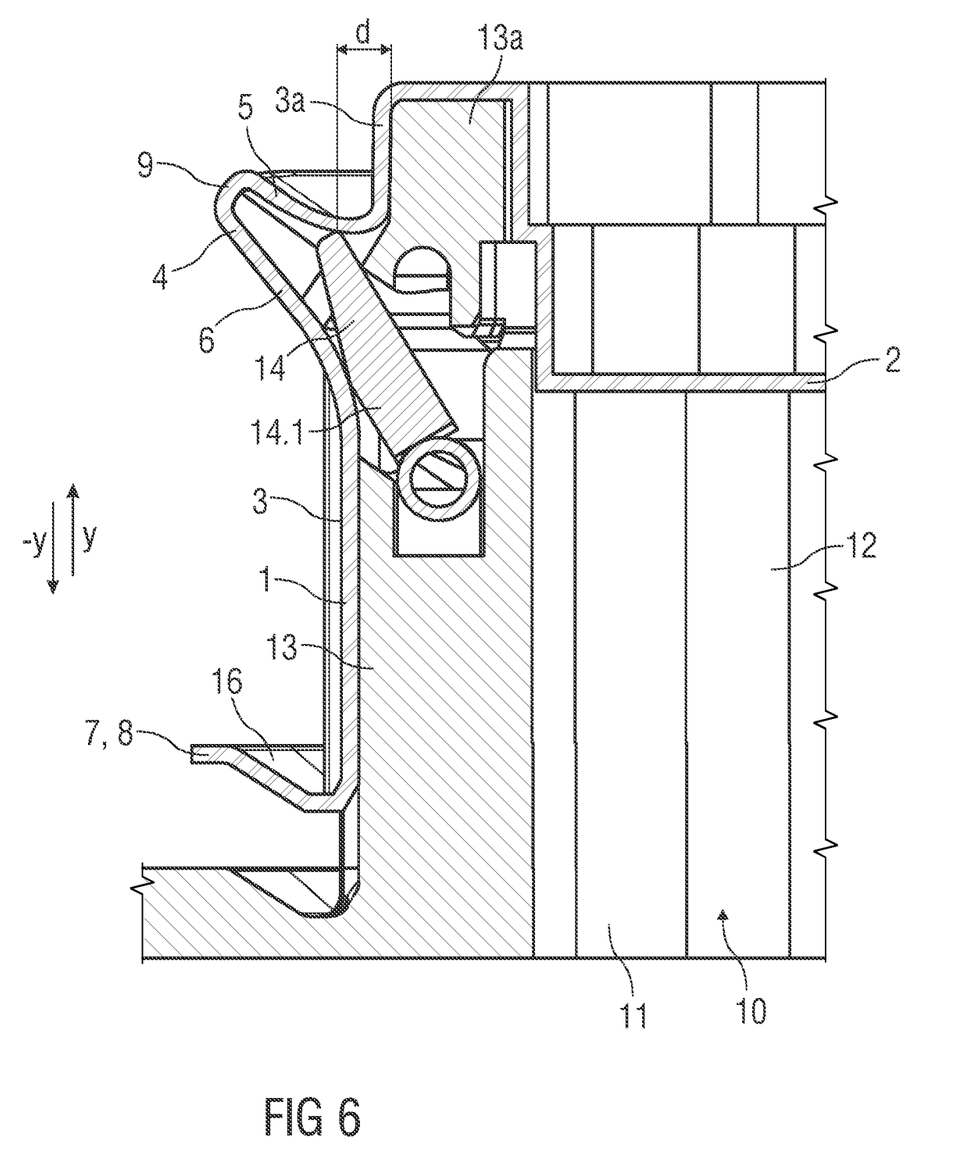
FIG. 6 is a schematic sectional view of the tool according to FIG. 1 and a container arranged within the tool during a demolding process in a third position.
Figure 7:
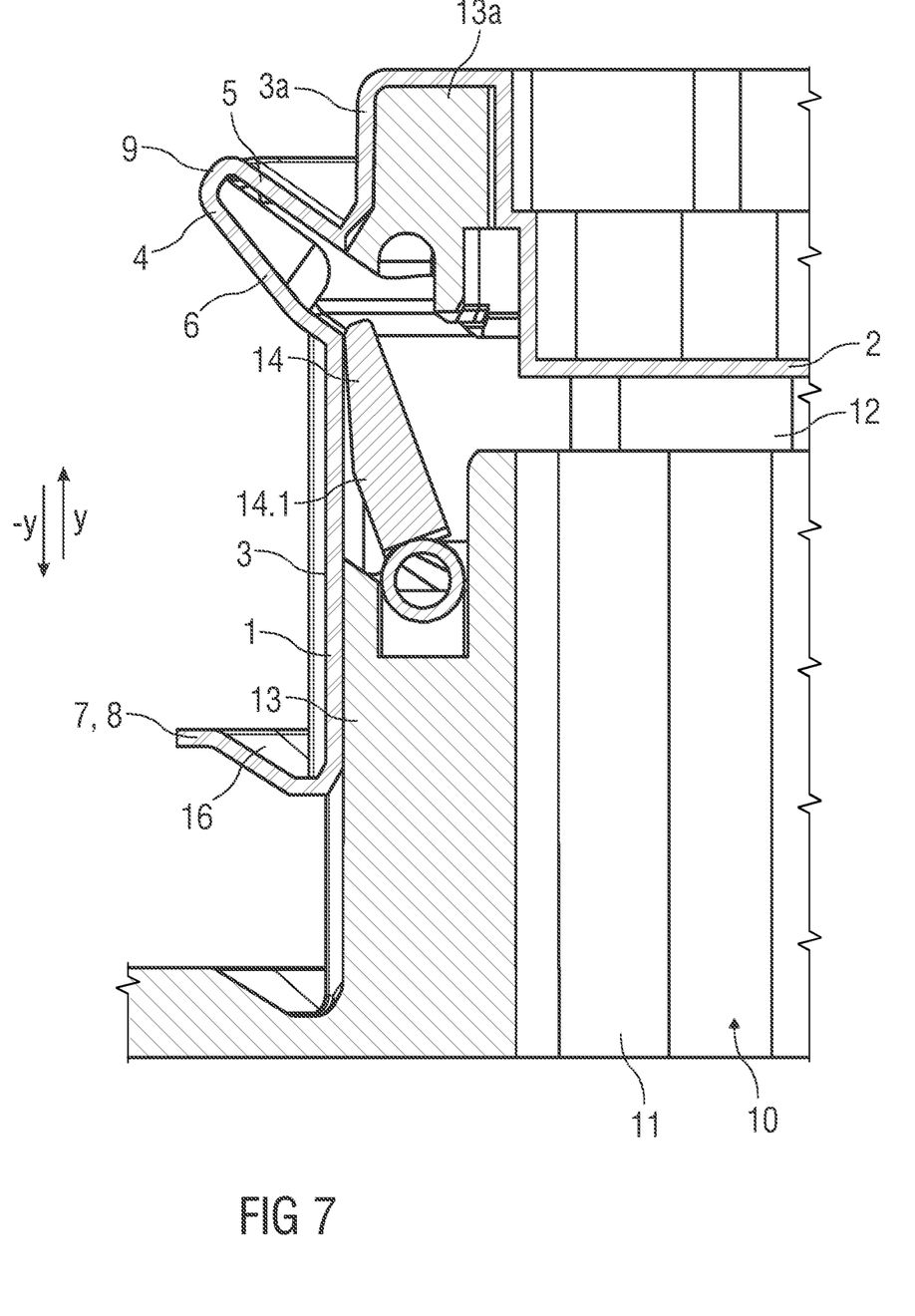
FIG. 7 is a schematic sectional view of the tool according to FIG. 1 and a container arranged within the tool during a demolding process in a fourth position.

Subsequently, the molding blank is remolded by means of low pressure and/or by means of a die (not shown) in such a way that the plastic is drawn over the positive mold 11 whose external contour forms an internal contour of the produced container 1. Doing this, the lower flange 4, i.e. its inward and thus toward the positive mold 11 directed notch, is formed by means of the protruding wall 14. For this purpose, in a molding position for forming the container 1, the wall 14 is arranged protruding circumferentially around the entire external face of the positive mold 11. Between a wall side 17 on which the lower side 5 of the stacking edge 9 is formed and which is directed toward the bottom section 12, and a portion 13a of the associated lateral wall section 13 extending from this wall side 17 toward the bottom section 12, the angle α, which is smaller than 90°, is formed. This is shown in FIG. 4 in more detail.

In order to allow for demolding the container 1 from the positive mold 11 without damaging the container 1, in particular in the range of the stacking edge 9, the wall 14 is movably arranged and, during demolding, is being moved from the molding position into at least one demolding position in which a distance d of an end of the wall 14 protruding in the molding position to the lateral wall section 13 is reduced, in order to release the circumferential stacking edge 9 during demolding of the container 1.

For this purpose, the wall 14 comprises multiple wall segments 14.1 to 14.n, in the illustrated embodiment eight wall segments 14.1 to 14.n, which are in each case swivel-mounted or hinged on the lateral wall section 13. A number of the swivel-mounted wall segments 14.1 to 14.n for forming the stacking edge 9 depends on the external contour of the container 1 to be produced.

In the molding position, a movement of the wall segments 14.1 to 14.n is blocked in the molding direction Y which, starting from the bottom section 12, extends along the lateral wall section 13, and is enabled in the demolding direction −Y which extends contrary to the molding direction Y. In other words: The wall segments 14.1 to 14.n are blocked in position in the molding direction Y and remain in this position during the deep drawing process proper. In the reverse movement, i.e. in the demolding direction −Y, they move along in an articulated way and release the stacking edge 9 again. In the context, the molding direction Y and the demolding direction −Y relate to a relative movement of the molding blank or container 1 relative to the tool 10, but do not necessarily relate to absolute directions of movement which are being performed by the molding blank or container 1 and the tool 10.

In a possible embodiment (not illustrated in detail), in order to remain in this way, the swivel-mounted wall segments 14.1 to 14.n are in each case coupled to at least one spring who exerts a force contrary to the pivoting direction on the respective wall segment 14.1 to 14.n.

FIGS. 4 to 7 show sectional views of the tool 10 according to FIG. 1 and of the container 1 arranged within the tool 10 after molding thereof and in different positions during demolding thereof.

The illustrations in these figures illustrate the movement of the wall segments 14.1 to 14.n by the example of the wall segment 14.1. Herein, the wall segment 14.1 moves in the illustrated way during demolding of the container 1, wherein the movement of the call 14 into the demolding position during demolding of the container 1 is guided by means of the container 1 itself. In order to avoid damaging the container 1 in the range of the stacking edge 9, the container 1 is cooled down prior to demolding to a temperature which allows for an elastic deformation of the container 1 at least in the range of the stacking edge 9. Thus, when the wall segments 14.1 to 14.n slip out, the stacking edge 9 can deform according to a movement of an external contour of the wall segments 14.1 to 14.n and subsequently return to its initial form.

Figure 8:
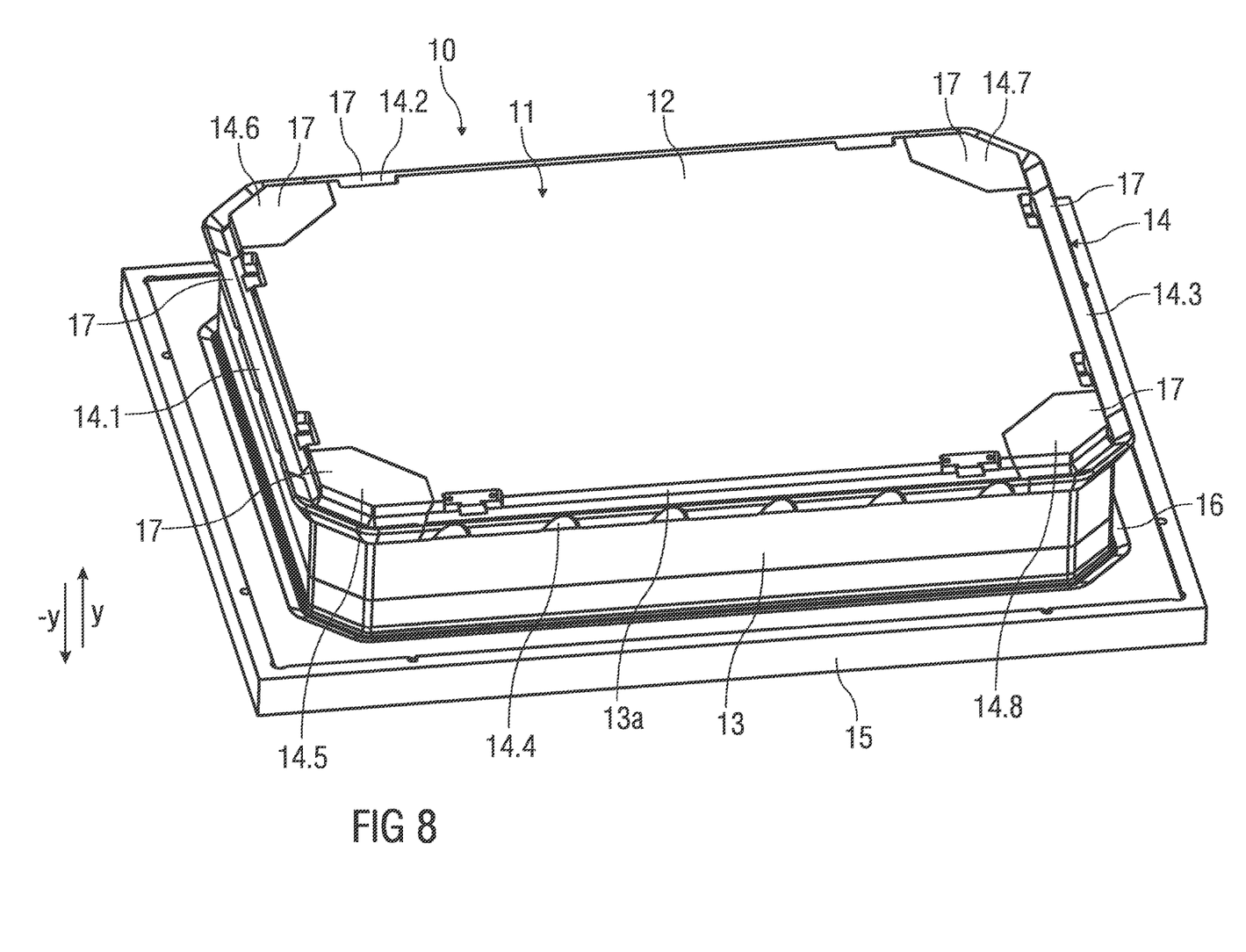
FIG. 8 is a schematic perspective view of a second embodiment of a tool in a molding position.
Figure 9:
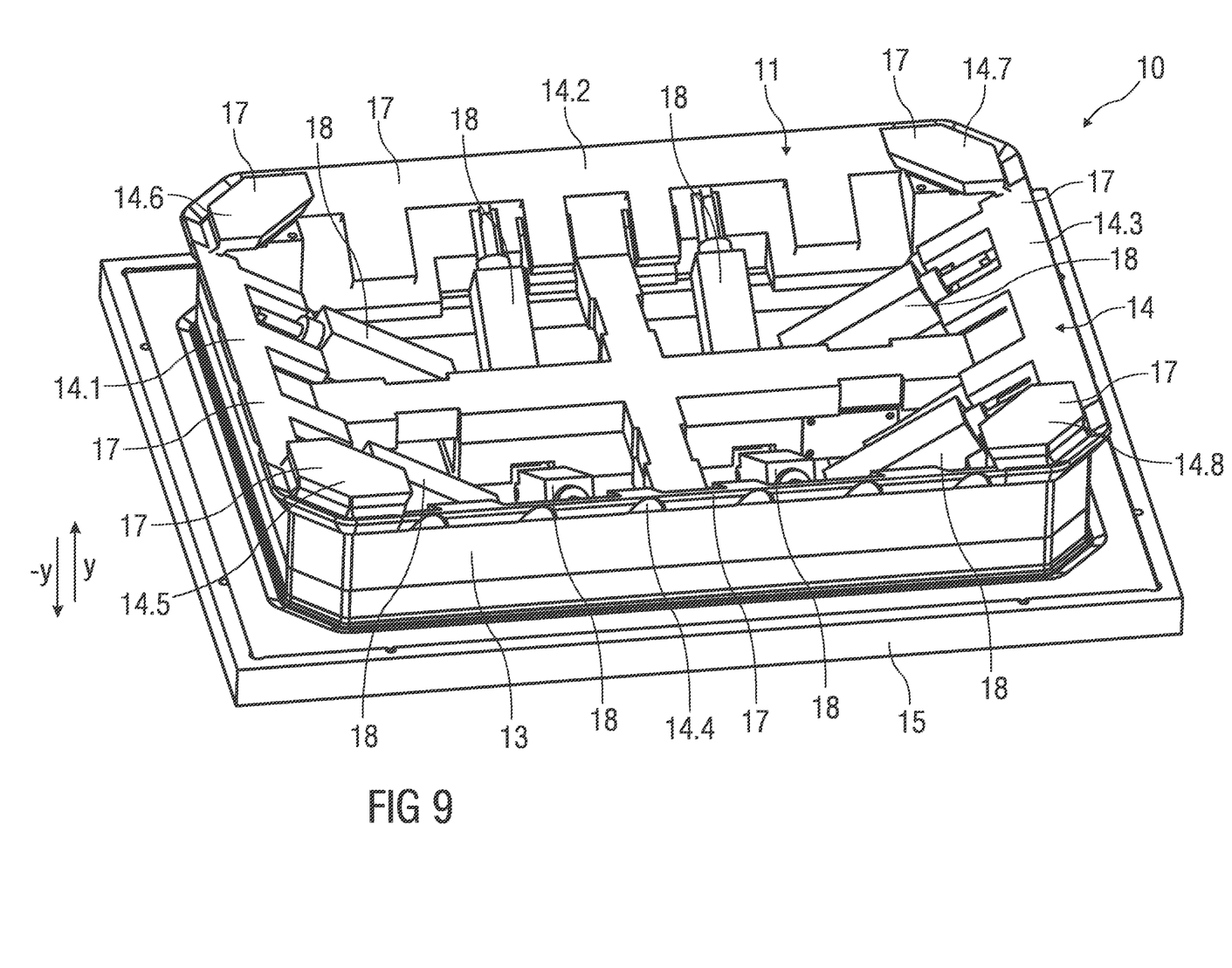
FIG. 9 is a schematic perspective view of the tool according to FIG. 8 without showing the bottom section.

FIG. 8 is a perspective view of a possible further embodiment of a tool 10 for producing the container 1 according to FIGS. 1 and 2, shown in a molding position. FIG. 9 shows a perspective view of the tool 10 according to FIG. 8 without showing a bottom section 12 in order to allow for viewing the interior of the tool 10.

In contrast to the embodiment of the tool 10 shown in FIGS. 3 to 7, the wall 14 for forming the stacking edge 9 comprises multiple wall segments 14.1 to 14.n formed as sliders, which, starting from their molding position, which corresponds to the molding position of the corresponding wall segments 14.1 to 14.n in FIGS. 3 to 7, can be moved into an interior of the positive mold 11.

Herein, four wall segments 14.1 to 14.n are arranged as inclined linearly movable sliders. These sliders are in each case coupled to a motor-driven, hydraulic and/or pneumatic drive 18 for effecting the movement.

Wall segments 14.5 to 14.8 arranged at corners of the lateral wall section 13 are configured as so called gravity sliders, which are blocked by the lateral wall section 13 and the adjacent sliders in the molding position, and which are released after linearly moving the adjacent sliders into the interior of the positive mold 11 in such a way that these move automatically into the interior of the positive mold 11, e.g. into an initial position, during demolding due to gravity. In other words: In the molding direction, the linearly movable sliders are extended in position and the gravity sliders are blocked by frame stops. These also remain in this position during the deep drawing process proper.

Firstly, also in this embodiment of the tool 10, in order to produce the container 1, the molding blank (not shown in detail) made from plastic, in particular thermoplastic, is heated to become deformable. The heating is achieved for example by means of external heat sources (not shown in detail).

Subsequently, the molding blank is remolded by means of low pressure and/or by means of a die (not shown) in such a way that the plastic is drawn over the positive mold 11 whose external contour forms an internal contour of the produced container 1. Doing this, the lower flange 4, i.e. its inward and thus toward the positive mold 11 directed notch, is formed by means of the protruding wall 14. For this purpose, in a molding position for forming the container 1, the wall 14 is arranged protruding circumferentially around the entire external face of the positive mold 11. Between a wall side 17 on which the lower side 5 of the stacking edge 9 is formed and which is directed toward the bottom section 12, and a portion 13a of the associated lateral wall section 13 extending from this wall side 17 toward the bottom section 12, the angle α, which is smaller than 90°, is formed.

Subsequently, in order to demold the container 1, the four wall segments 14.1 to 14.4 configured as linearly movable sliders are firstly moved inward into the positive mold 11 and release the shown long and short sides of the stacking edge 9. Furthermore, this way a movement of the further wall segments 14.5 to 14.8 configured as gravity sliders is being unblocked such that a movement of the container 1 in the demolding direction −Y is unblocked. During demolding, the gravity sliders move aslope inwardly with the reverse movement due to contact friction to the notches of the stacking edge 9 which form undercut faces, such that they leave the undercut area beginning at a certain travel and the container 1 is completely free and demolded.

Figure 10:
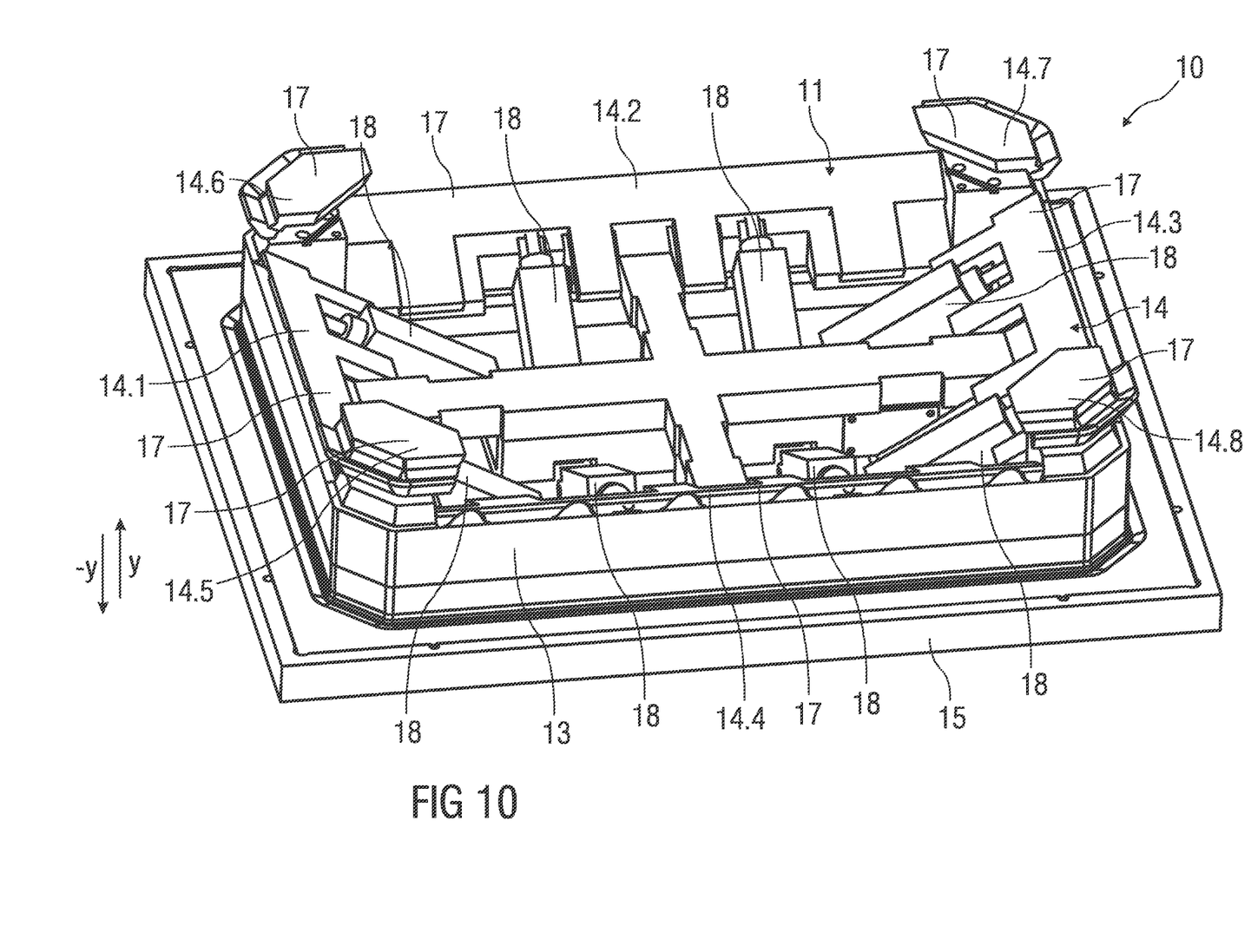
FIG. 10 is a schematic perspective view of the tool according to FIG. 8 in a demolding position without showing the bottom section.

Such a state, in which the four wall segments 14.1 to 14.*n* configured as linearly movable sliders are moved inward into the positive mold 11 and release the long and short sides of the stacking edge 9, is shown in FIG. 10, in which the tool 10 is shown without the bottom section 12 in order to allow for viewing the interior of the tool 10. After moving the wall segments 14.1 to 14.*n* into the illustrated position, movement of the further wall segments 14.5 to 14.8 configured as gravity sliders into the interior of the tool 10 is unblocked.

REFERENCE SIGNS 1 container
2 container bottom
3 lateral wall
3*a* section
4 flange
5 lower sidee
6 upper side
7 flange
8 stacking edge
9 stacking edge
10 tool
11 positive mold
12 bottom section
13 lateral wall section
13*a* portion
14 wall
14.1 bis 14.*n* wall segment
15 base plate
16 recess
17 wall side
18 drive
d distance
Y molding direction
−Y demolding direction
α angle

The invention claimed is:

1. A tool for producing a plastic container, the tool comprising:
  a positive mold, comprising:
  a bottom section configured to form a container bottom,
  a lateral wall section configured to form a circumferential, lateral wall,
  a mold wall configured to form a stacking edge formed as a hollow profile, circumferentially protruding beyond an external contour of the lateral wall of the container around an entire external container face, wherein the stacking edge is inwardly formed as an open notch toward an inner container side and arranged at a distance from the container bottom, wherein in a molding position for forming the container, the mold wall protrudes circumferentially around an entire external side of the positive mold, wherein an angle smaller than 90° is formed between a mold wall side directed toward the bottom section and a portion of an associated lateral wall section extending from this mold wall side toward the bottom section, wherein the mold wall is movable out of the molding position into a demolding position, in which a distance of an end of the mold wall protruding in the molding position to the lateral wall section is reduced, and the mold wall comprises a plurality of wall segments which in each case are swivel-mounted on the lateral wall section, and in the molding position, a movement of the wall segments in a molding direction, starting from the bottom section and running along the lateral wall section, is blocked, and the movement in a demolding direction which extends contrary to the molding direction, is enabled.

2. The tool according to claim 1, wherein the swivel-mounted wall segments are in each case coupled to at least one spring which exerts a force on one respective wall segment against a pivoting direction.

3. The tool according to claim 1, wherein the mold wall comprises a plurality of wall segments formed as sliders, which, starting from the molding position, are movable into an interior of the positive mold.

4. The tool according to claim 3, wherein wall segments arranged at corners of the lateral wall section are configured as gravity sliders, which are blocked by the lateral wall section and by adjacent sliders in the molding position, and which are released after moving the adjacent sliders into the interior of the positive mold in such a way that these move automatically into the interior of the positive mold during demolding due to gravity.

5. The tool according to claim 3, wherein the sliders are coupled in each case to a motor-driven, hydraulic and/or pneumatic drive configured to perform the movement.

6. The tool according to claim 4, wherein the sliders are coupled in each case to a motor-driven, hydraulic and/or pneumatic drive configured to perform the movement.

7. A tool for producing a plastic container, the tool comprising a positive mold, comprising:
  a bottom section configured to form a container bottom,
  a lateral wall section configured to form a circumferential, lateral wall,
  a mold wall configured to form a stacking edge formed as a hollow profile, circumferentially protruding beyond an external contour of the lateral wall of the container around an entire external container face, wherein the stacking edge is inwardly formed as an open notch toward an inner container side and arranged at a distance from the container bottom, wherein in a molding position for forming the container, the mold wall protrudes circumferentially around an entire external side of the positive mold, wherein an angle smaller than 90° is formed between a mold wall side directed toward the bottom section and a portion of the associated lateral wall section extending from this mold wall side toward the bottom section, wherein the mold wall is movable out of the molding position into a demolding position, in which a distance of an end of the mold wall protruding in the molding position to the lateral wall section is reduced, and wherein the mold wall comprises a plurality of wall segments formed as sliders, which, starting from the molding position, are movable into an interior of the positive mold.

8. The tool according to claim 7, wherein the swivel-mounted wall segments are in each case coupled to at least one spring which exerts a force on one respective wall segment against a pivoting direction.

9. The tool according to claim 8, wherein wall segments arranged at corners of the lateral wall section are configured as gravity sliders, which are blocked by the lateral wall section and by adjacent sliders in the molding position, and which are released after moving the adjacent sliders into the interior of the positive mold in such a way that these move automatically into the interior of the positive mold during demolding due to gravity.

10. The tool according to claim 9, wherein the sliders are coupled in each case to a motor-driven, hydraulic and/or pneumatic drive configured to perform the movement.

11. The tool according to claim 9, wherein the sliders are coupled in each case to a motor-driven, hydraulic and/or pneumatic drive configured to perform the movement.

\* \* \* \* \*